United States Patent [19]

Roelle

[11] Patent Number: 4,833,935
[45] Date of Patent: May 30, 1989

[54] LAWN MOWER ELECTRIC START CONTROL

[75] Inventor: David R. Roelle, Conroe, Tex.

[73] Assignee: Capro, Inc., Willis, Tex.

[21] Appl. No.: 60,674

[22] Filed: Jun. 11, 1987

[51] Int. Cl.$^4$ ............................................. G05G 11/00
[52] U.S. Cl. .................................. 74/483 R; 56/10.8;
180/19.3
[58] Field of Search ................ 74/483 R, 491, 501 R;
180/19.3; 56/10.5, 10.8, 11.3

[56] References Cited

U.S. PATENT DOCUMENTS

| | | | |
|---|---|---|---|
| 4,195,534 | 4/1980 | Prince | 74/491 |
| 4,363,206 | 12/1982 | Schmitt | 56/11.3 |
| 4,413,466 | 11/1983 | Beugelsdyk et al. | 56/11.3 |
| 4,428,180 | 1/1984 | Carlson | 56/11.3 |
| 4,466,232 | 8/1984 | Beugelsdyk et al. | 56/10.8 |
| 4,466,308 | 8/1984 | Kester et al. | 74/483 R |
| 4,580,455 | 4/1986 | Beugelsdyk et al. | 56/11.3 |
| 4,599,912 | 7/1986 | Barnard et al. | 74/501 R |
| 4,614,130 | 9/1986 | Heismann et al. | 74/501 R |
| 4,667,459 | 5/1987 | Scanland et al. | 56/11.3 |

Primary Examiner—Leslie A. Braun
Assistant Examiner—Scott Anchell
Attorney, Agent, or Firm—Vinson & Elkins

[57] ABSTRACT

The present invention relates to an improved electric start lawn mower control. The improved control includes a housing having a bail disc and a cable disc pivotally mounted therein, an electric switch secured within the housing and a starter button accessible on the exterior of the housing for actuation by the operator and having an arm which pivots to actuate the switch when the starter button is depressed. The bail disc includes a stop shoulder to mechanically prevent operation of the starter button until the bail disc is moved to its bail down position and the cable disc is moved to the "on" position. The bail disc is interconnected with the cable disc so that movement of the bail disc moves the cable disc to move the cable from its "off" position to its "on" position and release of said bail disc allows said cable disc and its cable to return to its "off" position. Additionally the housing includes the cable and wiring exiting through the same opening.

9 Claims, 2 Drawing Sheets

LAWN MOWER ELECTRIC START CONTROL

BACKGROUND

Lawn mowers have previously included controls having an electric start feature but such prior structures have been disadvantageous in many respects.

For example, one type of prior starting control is disclosed in U.S. Pat. No. 4,466,308. The control of this patent includes a control lever and a bail, with the bail having a mounting block for connecting to a cable disk which has a slot in which the block is engaged to allow sliding movement of the disk with respect to the bail when the bail is fully depressed to its operating position and to rotate with the movement of the bail when it is being moved to its operating position. The cable is in its "off" position when the bail is released, is in its "on" position when the bail is depressed to its operating position and is pulled to its "start" position when the lever is actuated to slide the disk on its bail mounting block. The release of the bail at any time returns the cable disk to its "off" position.

U.S. Pat. No. 4,599,912 discloses another start control which provides the control structure to move a cable into its desired positions of "off", "on" and "start" responsive to the positions of the bail and a control lever. The bail ensures that the cable moves to its "off" position at any time the bail is released. This patent provides for relative movement of the cable with respect to the cable disk responsive to movement of the lever. This is possible because the connection between the cable and the bail disc includes a lost motion connection and the lever engages the cable separately to move it to the "start" position.

Such mechanisms are complex and subject to problems because of the use of the mechanical cable operation to operate the start switch.

Another device of the prior art has a switch in the handle mounted control. This control includes a cable disk having the cable secured thereto and being rotated by the bail. The cable disk has an exterior shape to engage a switch which is pivotally mounted within the control housing and cam the switch into position so that it can be actuated by a starter button mounted within an opening in the housing. This control has serious disadvantages of flexing the wires leading to and from the switch each time the bail moves and does not provide protection for the wires which are passed through a separate opening in the housing from the sheathed cable and then joined by plastic tape to the protective sheath surrounding the wires and sheathed cable. To avoid premature engagement of the switch it is spring biased to a position which avoids engagement by the starter button.

The prior art devices do not provide a positive mechanical lock to prevent engagement of the start switch in the control housing responsive to the position of the bail. They do not conduct the wiring and sheathed cable into the control housing through a single opening in the housing surrounded by a protective sheath to the opening. Further, such prior devices having a starter button have pivoted the switch wires to render the switch active or inactive.

In prior art controls for starting lawn mower engines, the starting function has normally been controlled by a control lever but some controls have been provided in which the starter circuit is wired through the control and included a starter button extending from the control housing. This has proven to be disadvantageous since it is possible to inadvertently depress the starter button.

Additionally, slack has been provided in the cable control system to accommodate for wear in the control mechanism (such as brake or clutch or a combined brake and clutch control). This slack has normally been accomplished by causing the cable end to have a sliding engagement with the cable control disc.

SUMMARY

The present invention relates to an improved electric start engine control or lawn mower engine control. The improved control includes a housing having a bail disc and a cable disc pivotally mounted therein, an electric switch secured within the housing and a starter button accessible to the exterior of the housing for actuation by the operator and having an arm which pivots to actuate the switch when the button is depressed. The bail disc includes a stop shoulder to mechanically prevent operation of the starter button until the bail is moved to the operating or bail down position and the cable disc is moved to the cable "on" position. The bail disc is interconnected with the cable disc so that movement of the bail moves the cable disc to move the cable from its "off" position to its "on" position. Additionally the housing includes a means for having the cable and wiring exit through the same opening.

An object of the present invention is to provide an improved engine electric starter control in which the starter button is mechanically prevented from functioning until the cable is moved to the "on" position and the bail is depressed to its operating or bail down position.

Another object is to provide an improved electric start lawn mower control having an internal starter switch in which the switch wiring in the control housing is not flexed in its actuation to start the mower engine.

A further object is to provide an improved electric start lawn mower control in which the wiring and sheathed cable are protected by an exterior flexible sheath which is secured to the housing surrounding the entrance opening therein through which the wiring and sheathed cable extend to reach the interior of the housing.

Still another object is to provide an improved electric start control for a lawn mower in which the wiring and sheathed cable enter the control housing through the same opening without interfering with the operation of the cable.

A still further object is to provide an improved electric start control for a lawn mower having a start button accessible from the exterior of the control housing but protected against inadvertent actuation.

Another object is to provide an improved electric start control for a lawn mower allowing cable slack to accommodate for mechanism wear without having a lost motion connection between the cable end and the cable disc.

BRIEF DESCRIPTION OF THE DRAWINGS

These and other objects and advantages of the present invention are hereinafter set forth and explained with reference to the drawings wherein:

FIG. 5 is a partial sectional view taken along line V—V in FIG. 2 to illustrate the protected position of switch operating button in its opening through the housing.

DESCRIPTION OF THE PREFERRED EMBODIMENT

Figure 1:
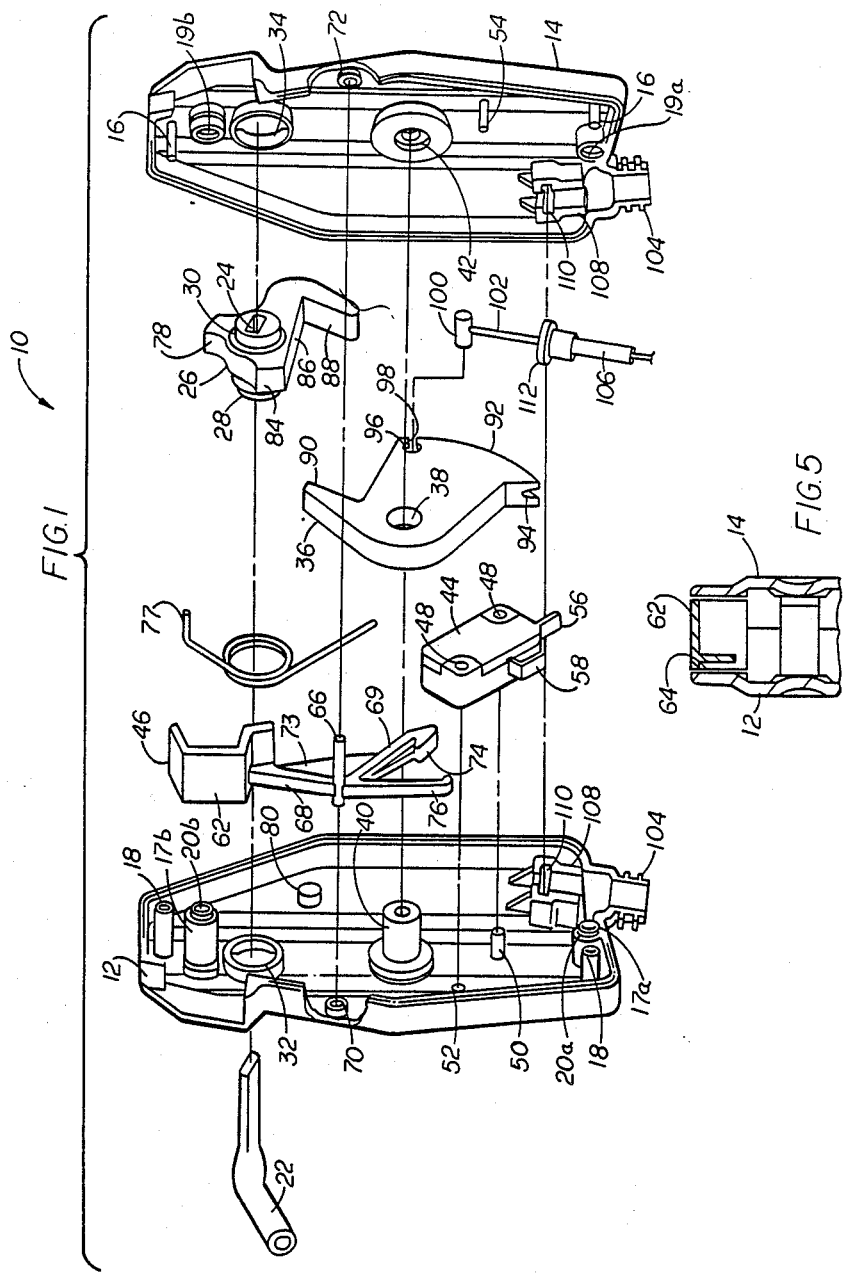
FIG. 1 is an exploded view of the improved electric starter control of the present invention with one of the housing sections rotated to illustrate its interior.

The improved control 10 of the present invention is shown in the drawings and includes housing sections 12 and 14 which are adapted to fit together and to be held in such position by the interengagement of the pins 16 on the interior of section 14 which fit tightly into the openings in posts 18 which extend from the interior of section 12 and posts 17a and 17b on the interior of section 12 which fit tightly into recesses 19a and 19b on the interior of section 14. Openings 20a and 20b in posts 17a and 17b and recesses 19a and 19b extend through sections 12 and 14 to provide a means for the securing of control 10 on a leg of the handle of a lawn mower in the well known manner.

Bail 22 is pivotally mounted to the handle and one end is flattened to be received within slotted opening 24 in bail disc 26 which has its pin ends 28 and 30 pivotally mounted within openings 32 and 34 in housing sections 12 and 14. Cable disc 36 is also pivotally mounted between housing sections 12 and 14 with its central opening 38 receiving post 40 which extends from the interior of housing section 12 and is received within recess 42 on the interior of housing section 14.

Additionally, switch 44 and switch operating mechanism 46 are mounted between housing sections 12 and 14 as hereinafter described. Switch 44 includes openings 48 to receive posts 50 and 52 which extend from the interior of housing section 12. Post 54 extending from the interior of housing section 14 is positioned to engage the surface of switch 44 facing section 14 to retain switch 44 in its desired position on posts 50 and 52. Switch 44 includes contacts 56 and 58 to which wiring for the starter circuit are connected. Actuator 60 is positioned on the side of switch 44.

Switch operating mechanism 46 is mounted between housing sections 12 and 14 and includes button 62 positioned in opening 64 in the sides of sections 12 and 14. Housing sections 12 and 14 are shaped to surround button 62 so that the outer surface of button 62 does not extend 35 beyond the adjacent portions of housing sections 12 and 14 as shown in FIG. 5. Pivot pin 66 is connected to button 62 by arm 68 and is received within recesses 70 and 72 in sections 12 and 14. Arm 69 extends beyond pivot pin 66 to form actuating pad 74 and gusset 73 supports arms 68 and 69 to limit their flexibility. Flexible arm 76 extends from pivot pin 66 into engagement with the inner wall of section 12 to bias actuating pad 74 away from actuator 60. As can be seen from FIG. 2, actuating pad 74 is positioned in close spaced relationship to actuator 60 in its normal position.

Spring 77 surrounds pin 28 of bail disc 26 and engages arm 78. The other end of spring 77 engages post 80 extending from the interior of housing section 12. In this manner bail disc 26 is biased in a counterclockwise direction urging the arm 78 against post 17b. Bail disc 26 also includes shoulder surface 84 and arm 86 having finger 88 projecting therefrom for engagement with cable disc 36, as hereinafter described. While bail disc 26 is in its off or bail up position, shoulder surface 84 is positioned under button 62 to prevent actuation of starter button 46 as shown in FIG. 2.

Cable disc 36 includes arm 90 and cable engaging segment 92. Segment 92 includes cable groove 94 and opening 96 extending through segment 92 into communication with groove 94. Slot 98 is provided in segment 92 to allow insertion of pin 100 on the end of cable 102 into opening 96. Slot 98 is smaller than pin 100 so that when cable 102 is positioned in groove 94, cable pin 100 can not disengage from cable disc 36. Cable 102 is under a tension supplied by a suitable means (not shown) such as a spring in the engine.

Housing sections 12 and 14 include mating semi-tubular extensions 104 through which cable 102 and its sheath 106 enter control 10. The interior of sections 12 and 14 include raised portions 108 having half slots 110 to receive flange 112 on the end of sheath 106 to secure sheath 106 in position and allow all movement of cable 102 to be an axial movement through sheath 106. Wiring 114 for the starter circuit extends into control 10 through tubular extensions 104 and connects to contacts 56 and 58. Exterior sheath 116 engages the exterior of tubular extensions 104 and is suitably secured thereon, as by band 118. Sheath 116 is designed to surround wiring 114 and cable 102 and its sheath 106 to protect them as they extend along the handle leg to the mower engine (not shown).

Figure 2:
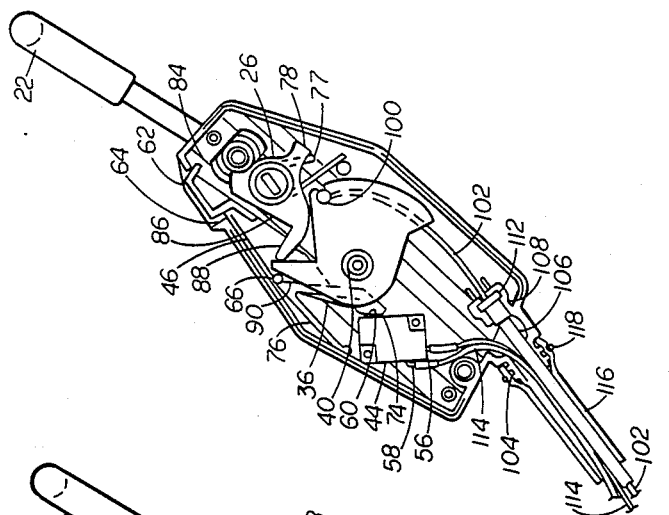
FIG. 2 is a view of the interior of the improved control in the cable "off" position.

Control 10 is in the "off" position, as shown in FIG. 2. To complete the starting operation, bail 22 is first grasped and pulled to the rear to the bail down position, normally into a position resting on the rear handle cross portion or sufficiently near thereto so that it is easily held in this position by an operator during all operations of the mower as the bail will also stop blade rotation whenever it is released by the operator. Bail disc 26 is biased in the counterclockwise direction by spring 77 so that its arm 78 is abutting the exterior of post 19b in the bail up position.

Figure 3:
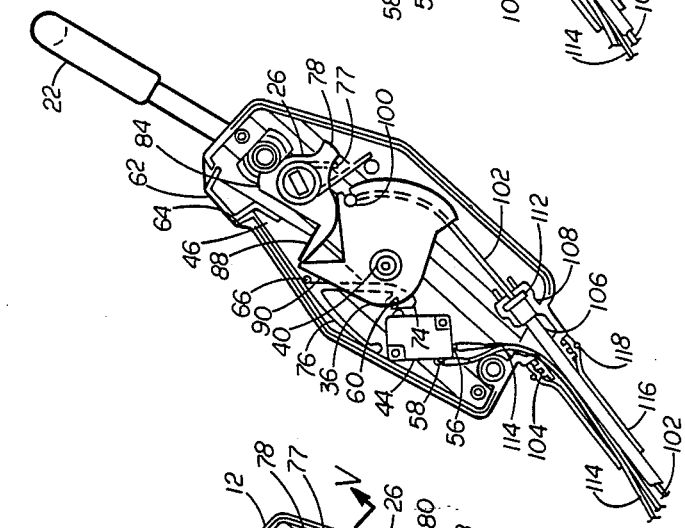
FIG. 3 is another view of the interior of the improved control in the cable "on" position.

The movement of bail 22 to its operating or bail down position rotates bail disc 26 to the position shown in FIG. 3. Bail disc 26 has been rotated in the clockwise direction. Finger 88 on arm 86 has engaged arm 90 on cable disc 36 and caused a counterclockwise rotation of cable disc 36 to the position shown in FIG. 3. This movement of cable disc 36 has caused an axial movement of cable 102 so that the engine is in the "on" position and ready for starting.

Figure 4:
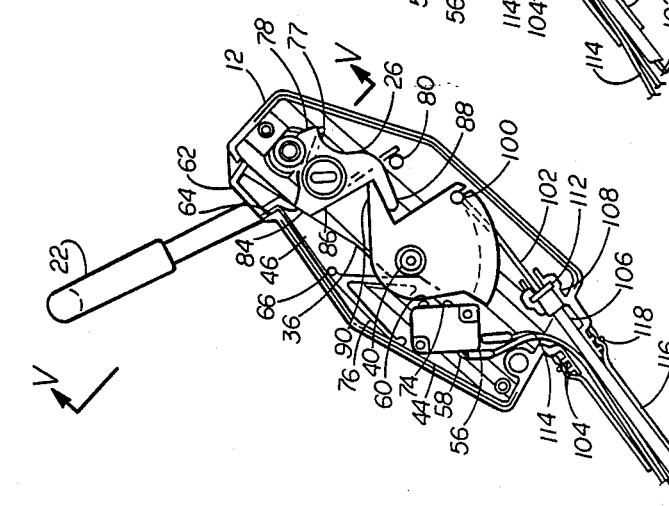
FIG. 4 is another view of the interior of the improved control in the "start" position.

The pushing of button 62 inwardly as shown in FIG. 4 causes switch operating mechanism 46 to rotate in the clockwise direction about its pin 66 to bring actuator pad 74 against and depressing actuator 60 of switch 44. When the engine has started, button 62 is released and operation of the lawn mower proceeds in the usual manner.

The improved control provides a safe and sure method of starting which will last for the life of the other equipment of the lawn mower because there is no flexing of the wiring responsive to movement of the switch and the bail is utilized to move the components of the starter control into the "on" position and to release the mechanical stop preventing engagement of the button 62 on starter switch 44. Additionally, there is a provision in the cable disc to allow sufficient slack so that the control will function properly after there has been considerable wear in the starter mechanism. The switch operating button which is accessible from the exterior of the housing is protected by the housing which projects as high as the top of the button around its top to protect against inadvertent actuation of the starting mechanism.

What is claimed is:

1. A control for electric starting of an engine comprising
    a housing including a pair of mating housing sections having interengaging elements to ensure proper mating of the sections and openings through which aid housing can be secured to a mower handle,
    a bail,
    a bail disc pivotally mounted within said housing and having an opening therethrough for receiving one end of said bail in nonrotating relationship to said disc whereby said bail is pivotally mounted to said housing between "bail up" and "bail down" positions, said bail disc being rotated responsive to movements of said bail between bail disc positions of bail up and bail down,
    a cable disc pivotally mounted within said housing and having means for receiving the end of a control cable therein so that movement of said disc results in movement of said cable between its "on" and "off" positions,
    a starter switch secured within said housing and having electric connections and a switch actuator extending from the switch body, and
    a starter mechanism pivotally mounted within said housing and having a button positioned in an opening through said housing and a pad normally held in close spaced relationship to said starter switch actuator,
    said bail disc having means preventing actuation of said starter button until said bail disc has been rotated to its bail down position,
    said bail disc also having means for interengaging with said cable disc whereby rotation of said bail disc responsive to movement of said bail to its bail down position rotates said cable disc to move said control cable to "on" position.

2. A control according to claim 1 wherein
    release of said bail disc from its bail down position releases said cable disc to return to its off position.

3. A control for electric starting of an engine comprising
    a housing,
    a bail disc pivotally mounted within said housing between a "bail up" and a "bail down" positions,
    a cable disc pivotally mounted within said housing and having means for receiving the end of a control cable therein so that movement of said bail disc results in movement of said cable disc and said cable,
    an electric switch secured within said housing and having electric connections and a projecting actuator,
    a switch operating mechanism having a starter button accessible to the exterior of the housing and means for engaging said projecting actuator upon movement of said starter button, and
    means on said bail disc blocking the movement of said starter button when said bail disc is in its "bail up" position.

4. A control according to claim 3 including
    means biasing said bail disc toward its bail up position.

5. A control according to claim 3 wherein
    said bail disc and said cable disc are interconnected so that movement of said bail disc to bail down position moves said cable disc to the cable "on" position and release of the bail disc to its bail up position releases the cable disc to return to the cable "off" position.

6. A control according to claim 3 including
    a tubular projection from said housing,
    said cable and electric wiring extending through said tubular projection into said housing,
    said electric wiring connecting to said electric switch.

7. A control according to claim 6 including
    a sheath surrounding said cable and extending into said housing through said tubular projection, and
    means for securing the inner end of said sheath within said housing.

8. A control according to claim 3 wherein said switch operating mechanism also includes
    a pin engaging within a recess in said housing for pivoting of said mechanism, and
    a flexible arm extending from said pin and engaging an inner wall of said housing to bias said means for engaging said switch actuator away from said switch actuator,
    inward movement of said starter mechanism button flexing said flexible arm and moving said engaging means against said switch actuator to actuate said switch.

9. A control according to claim 3 wherein
    said housing includes shield lips surrounding said switch operating button so that said button is accessible from the exterior of the housing but does not project beyond the shield lips whereby inadvertent engagement of said switch operating button is avoided.

* * * * *